(12) United States Patent
Asokan (10) Patent No.: US 8,892,829 B2
(45) Date of Patent: Nov. 18, 2014

(54) METHODS, SYSTEMS, AND COMPUTER READABLE MEDIA FOR INTEGRATED SUB-BLOCK INTERLEAVING AND RATE MATCHING

(75) Inventor: Ramanathan Asokan, Cary, NC (US)

(73) Assignee: Ixia, Calabasas, CA (US)

( * ) Notice: Subject to any disclaimer, the term of this patent is extended or adjusted under 35 U.S.C. 154(b) by 250 days.

(21) Appl. No.: 13/408,787

(22) Filed: Feb. 29, 2012

(65) Prior Publication Data

US 2013/0227233 A1 Aug. 29, 2013

(51) Int. Cl.
*G06F 12/06* (2006.01)

(52) U.S. Cl.
USPC .................................. 711/157; 711/E12.079

(58) Field of Classification Search
USPC ........................................ 711/157, E12.079
See application file for complete search history.

(56) References Cited

U.S. PATENT DOCUMENTS

| | | | |
|---|---|---|---|
| 5,561,841 A | 10/1996 | Markus | |
| 5,850,386 A | 12/1998 | Anderson et al. | |
| 6,125,072 A * | 9/2000 | Wu | 365/230.03 |
| 6,771,957 B2 | 8/2004 | Chitrapu | |
| 6,996,772 B2 | 2/2006 | Justice et al. | |
| 7,543,054 B1 | 6/2009 | Bansod et al. | |
| 7,765,313 B2 | 7/2010 | Jain et al. | |
| 8,601,585 B2 | 12/2013 | Beddoe et al. | |
| 2006/0276195 A1 | 12/2006 | Nordling | |
| 2009/0052473 A1* | 2/2009 | Choi et al. | 370/498 |
| 2009/0077456 A1 | 3/2009 | Pi et al. | |
| 2009/0077457 A1 | 3/2009 | Ramesh et al. | |
| 2009/0100300 A1 | 4/2009 | Kim | |
| 2009/0196244 A1 | 8/2009 | Chun et al. | |
| 2009/0245187 A1 | 10/2009 | Nam et al. | |
| 2010/0075678 A1 | 3/2010 | Akman et al. | |
| 2010/0165847 A1 | 7/2010 | Kamuf et al. | |
| 2010/0184447 A1 | 7/2010 | Miki et al. | |
| 2010/0195743 A1 | 8/2010 | Barsoum et al. | |
| 2010/0272011 A1 | 10/2010 | Palanki et al. | |
| 2010/0290371 A1 | 11/2010 | Beale | |
| 2010/0303011 A1 | 12/2010 | Pan et al. | |
| 2011/0032925 A1 | 2/2011 | Lee et al. | |
| 2011/0044196 A1 | 2/2011 | Ishii | |

(Continued)

OTHER PUBLICATIONS

Commonly assigned, co-pending U.S. Appl. No. 13/447,160 for "Methods, Systems, and Computer Readable Media for Heuristics-Based Adaptive Protocol Parsing," (Unpublished, filed Apr. 13, 2012).

(Continued)

*Primary Examiner* — Yong Choe
(74) *Attorney, Agent, or Firm* — Jenkins, Wilson, Taylor & Hunt, P.A.

(57) ABSTRACT

Methods, systems, and computer readable media for fast, reduced memory and integrated sub-block interleaving and rate matching are disclosed. According to one aspect, the subject matter described herein includes a system for integrated sub-block interleaving and rate matching, which includes a buffer memory for storing sub-block data that has been encoded according to a channel encoding algorithm and a rate matching module for reading the sub-block data from the buffer memory using a sequence of addresses according to an interleaving algorithm, such that data is transferred from the buffer memory to the rate matching module in an order that emulates the order that the data would be produced by the interleaving algorithm or in the order that the data would be produced by the interleaving algorithm as modified by a rate matching algorithm.

17 Claims, 10 Drawing Sheets

(56) References Cited

U.S. PATENT DOCUMENTS

| | | |
|---|---|---|
| 2011/0076962 A1 | 3/2011 | Chen et al. |
| 2011/0086659 A1 | 4/2011 | Yoon et al. |
| 2011/0119552 A1 | 5/2011 | Park et al. |
| 2011/0158333 A1 | 6/2011 | Nakano et al. |
| 2011/0170439 A1 | 7/2011 | Miki et al. |
| 2011/0206151 A1 | 8/2011 | McCloud et al. |
| 2011/0235586 A1 | 9/2011 | Han et al. |
| 2012/0033650 A1 | 2/2012 | Ahn et al. |
| 2012/0039246 A1* | 2/2012 | Zhang et al. ............... 370/315 |
| 2012/0042226 A1 | 2/2012 | Ramesh et al. |
| 2012/0051271 A1 | 3/2012 | Beale |
| 2012/0063384 A1 | 3/2012 | Bi et al. |
| 2012/0093249 A1 | 4/2012 | Sun et al. |
| 2012/0094651 A1 | 4/2012 | Chun et al. |
| 2012/0150521 A1 | 6/2012 | Balkwill |
| 2012/0170524 A1 | 7/2012 | Ren et al. |
| 2012/0204081 A1 | 8/2012 | Fresia et al. |
| 2013/0010724 A1 | 1/2013 | Han et al. |
| 2013/0024753 A1 | 1/2013 | Masuda et al. |
| 2013/0034062 A1 | 2/2013 | Seo et al. |
| 2013/0058240 A1 | 3/2013 | Kim et al. |
| 2013/0058294 A1 | 3/2013 | Miki et al. |
| 2013/0058306 A1 | 3/2013 | Noh et al. |
| 2013/0060735 A1 | 3/2013 | Haddy et al. |
| 2013/0070689 A1 | 3/2013 | Liu et al. |
| 2013/0070690 A1 | 3/2013 | Moon et al. |
| 2013/0088973 A1 | 4/2013 | Yang et al. |
| 2013/0115987 A1 | 5/2013 | Yoo et al. |
| 2013/0121168 A1 | 5/2013 | Luo et al. |
| 2013/0121295 A1 | 5/2013 | Saito et al. |
| 2013/0155867 A1 | 6/2013 | Asokan et al. |
| 2013/0155872 A1 | 6/2013 | Subramanian et al. |
| 2013/0155878 A1 | 6/2013 | Deng et al. |
| 2013/0184023 A1 | 7/2013 | Asokan et al. |
| 2013/0208600 A1 | 8/2013 | Campbell et al. |
| 2013/0208603 A1 | 8/2013 | Choi et al. |
| 2013/0227092 A1 | 8/2013 | Maestas |
| 2013/0275606 A1 | 10/2013 | Iyer |

OTHER PUBLICATIONS

Commonly assigned, co-pending U.S. Appl. No. 13/431,975 for "Methods, Systems, and Computer Readable Media for Dynamically Controlling a Turbo Decoding Process in a Long Term Evoloution (LTE) Multi-User Equipment (UE) Traffice Simulator," (Unpublished, filed Mar. 28, 2012).

Commonly assigned, co-pending U.S. Appl. No. 13/429,384 for "Scalable Architecture for Multiple User Equipment (Multi-UE) Simulation," (Unpublished, filed Mar. 25, 2012).

Commonly assigned, co-pending U.S. Appl. No. 13/396,577 for "Methods, Systems, and Computer Readable Media for Performing Long Term Evolution (LTE) Channel Delineation," (Unpublished, filed Feb. 14, 2012).

Commonly assigned, co-pending U.S. Appl. No. 13/371,389 for "Methods, Traffic Simulators, and Computer Readable Media for Validating Long Term Evolution (LTE) Code Blocks and Transport Blocks," (Unpublished, filed Feb. 10, 2012).

Commonly assigned, co-pending U.S. Appl. No. 13/352,058 for "Methods, Systems, and Computer Readable Media for Long Term Evolution (LTE) Uplink Data Processing," (Unpublished, filed Jan. 17, 2012).

Commonly assigned, co-pending U.S. Appl. No. 13/336,005 for "Methods, Systems, and Computer Readable Media for Reducing the Impact of False Downlink Control Information (DCI) Detection in Long Term Evolution (LTE) Physical Downlink Control Channel (PDCCH) Data," Dec. 30, 2011).

Commonly assigned, co-pending U.S. Appl. No. 13/326,264 "Methods, Systems, and Computer Readable Media for Improved Long Term Evolution (LTE) Hybrid Automatic Repeat Request (HARQ) Processing," (Unpublished, filed Dec. 14, 2014).

"3rd Generation Partnership Project; Technical Specification Group Radio Access Newtork; Evolved Universal Terrestrial Radio Accesss (E-UTRA) and Evolved Universal Terrestrial Radio Access Network (E-UTRAN); Overall description; Stage 2 (Release 9)," 3GPP TS 36.300 v9.9.0 (Dec. 2011).

"3rd Generation Partnership Project; Universal Moblile Telecommunications System (UMTS); Evolved Universal Terrestrial Radio Access (E-UTRA); Physical layer for relaying operation (Release 10)," 3GPP TS 36.216, v10.3.1 (Sep. 2011).

"3rd Generation Partnership Project; Technical Specification Group Radio Access Network; Evolved Universal Terrestrial Radio Access (E-UTRA); Physical layer procedures (Release 10)," 3GPP TS 36.213 V10.3.0 (Sep. 2011).

"3rd Generation Partnership Project; Technical Specificaion Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

Third Generation Partnership Project, "Technical Specification Group Radio Access Network; Evolved Universal Terrestrial Radio Access (E-UTRA); LTE Physical Layer, General Description," 3GPP TS 36.201 V10.0.0, Release 10 (Dec. 2010).

"IxCatapul Chassis," http://www.ixiacom.com/products/display?skey=ch_ixcatapult, pp. 1-2 (Downolded from the Internet Apr. 14, 2010).

"Wireless Network Testing," Ixia, 915-2623-01 Rev A, pp. 1-18 (Jan. 2010).

"Wireless Network Testing," Ixia, 915-2622-01 Rev A, pp. 1-16 (Jan. 2010).

"3rd Generation Partnership Project; Technical Specification Group Radio Access Network; Requirements for Evolved UTRA (E-UTRA) and Evolved UTRAN (E-UTRAN) (Release 9)," 3GPP TR 25.913, V9.0.0 (Dec. 2009).

"PDCCH Blind Decoding," PDCHH Decoding Example, http://www.steepstascent.com, pp. 1-6 (Copyright 2009-2011, downloaded from the Internet Dec. 4, 2011).

Non-Final Office Action for U.S. Appl. No. 13/431,975 (May 24, 2013).

Notice of Allowance and Fee(s) Due for U.S. Appl. No. 13/431,975 (Jan. 22, 2014).

Notice of Allowance and Fee(s) Due for U.S. Appl. No. 13/396,577 (Dec. 18, 2013).

Non-Final Office Action for U.S. Appl. No. 13/477,160 (Nov. 8, 2013).

Non-Final Office Action for U.S. Appl. No. 13/431,975 (Oct. 10, 2013).

Non-Final Office Action for U.S. Appl. No. 13/326,264 (Oct. 10, 2013).

Non-Final Office Action for U.S. Appl. No. 13/154,166 (Aug. 19, 2013).

Non-Final Office Action for U.S. Appl. No. 13/396,577 (Aug. 8, 2013).

Radio Electronics, "LTE CA: Carrier Aggregation Tutorial," pp. 1-7 http://www.radio-electronics.com/info/cellulartelecomms/lte-long-term-evolution/4g-lte-advanced-carrier-channel-aggregation.php (Printed from the Internet Aug. 7, 2013).

Share Technote, "Frame Structure—Downlink," pp. 1-11 http://www.sharetechnote.com/html/FrameStructure_DL.html#PCFICH (Printed from the Internet Aug. 7, 2013).

Non-Final Office Action for U.S. Appl. No. 13/336,005 (Jul. 2, 2013).

Commonly assigned, co-pending U.S. Appl. No. 13/835,658 for "Methods, Systems, and Computer Readable Media for Utilizing Adaptive Symbol Processing in a Multiple User Equipment (Multi-UE) Simulator," (unpublished, filed Mar. 15, 2013).

3rd Generation Partnership Project, "Technical Specification Group Radio Access Network: Evolved Universal Terrestrial Radio Access (E-UTRA); Physical layer procedures (Release 11)," 3GPP TS 36.213, V11.2.0, pp. 1-173 (Feb. 2013).

(56) References Cited

OTHER PUBLICATIONS

3rd Generation Partnersship Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).

3rd Generation Partnership Project, "Technical Specification Group Radio Access Network; Evolved Universal Terrestrial Radio Access (E-UTRA); Physical Channel and Modulation (Release 11)," 3GPP TS 36.211, V11.2.0, pp. 1-109 (Feb. 2013).

3rd Generation Partnership Project, "Technical Specification Group Radio Access Network; Evolved Universal Terrestrial Radio Accesss (E-UTRA); Physical layer; Measurements (Release 11)," 3GPP TS 36.214, V11.1.0, pp. 1-14 (Dec. 2012)

3rd Generation Partnership Project, "Technical Specification Group Radio Access Network; Evolved Universal Terrestrial Radio Access (E-UTRA); LTE physical layer; General description (Release 11)," 3GPP TS 36.201, V11.1.0, pp. 1-13 (Dec. 2012).

3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).

Xiao et al., "IMS Network Deployment Cost Optimization Based on Flow-Based Traffic Model," IEEE/IFIP Network Operations and Management Symposium—NOMS 2010, pp. 232-239 (2010).

"Network Topology," http://web.archive.org/web/20081219235147/http://en.wikipedia.org/wiki/Network_topology, pp. 1-9 (Dec. 19, 2008).

Applicant-Initiated Interview Summary for U.S. Appl. No. 13/154,166 (Apr. 28, 2014).

Non-Final Office Action for U.S. Appl. No. 13/429,384 (Apr. 9, 2014).

Final Office Action for U.S. Appl. No. 13/447,160 (Mar. 18, 2014).

Final Office Action for U.S. Appl. No. 13/154,166 (Mar. 3, 2014).

Final Office Action for U.S. Appl. No. 13/336,005 (Feb. 26, 2014).

Interview Summary for U.S. Appl. No. 13/447,160 (Feb. 25, 2014).

Final Office Action for U.S. Appl. No. 13/326,264 (Feb. 20, 2014).

3rd Generation Partnership Project "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).

Ikuno et al., "System level simulation of LTE networks," 2010 IEEE 71st Vehicular Technology Conference: VTC2010-Spring, (May 16-19, 2010).

Abbes et al., "Protocol Analysis in Intrusion Detection Using Decision Tree," IEEE, Proceedings of the International Conference on Information Technology: Coding and Computing (ITCC'04), pp. 1-5 (2004).

* cited by examiner

METHODS, SYSTEMS, AND COMPUTER READABLE MEDIA FOR INTEGRATED SUB-BLOCK INTERLEAVING AND RATE MATCHING

TECHNICAL FIELD

The subject matter described herein relates to methods and systems for processing telecommunications data, such as long term evolution (LTE) traffic. More particularly, the subject matter described herein relates to methods, systems, and computer readable media for fast, reduced memory and integrated sub-block interleaving and rate matching.

BACKGROUND

Long term evolution (LTE) and other radio communications technologies can require significant infrastructure and configuration. Generally, network operators test various aspects of their network equipment to ensure reliable and efficient operation. Network operators typically simulate various conditions before equipment is deployed in a live network to decrease avoidable delays and/or other problems.

Various technical specifications, such as the 3rd Generation Partnership Project (3GPP) Technical Specifications 36.211, 36.212, 36.213, and 36.214, hereinafter respectively referred to as "TS 36.211", "TS 36.212", "TS 36.213", and "TS 36.214", define aspects of LTE communications. Generally, data from the network to a user device is referred to as downlink data and data from the user device to the network is referred to as uplink data. For example, user equipment (UE), such as a cellular mobile phone, a laptop, other user device, may communicate with an enhanced or evolved Node B (eNode B) via the cellular radio transmission link. Data that is sent from the eNode B to the user device is downlink data, and data that is sent from the user device to the eNode B is uplink data.

Figure 1:
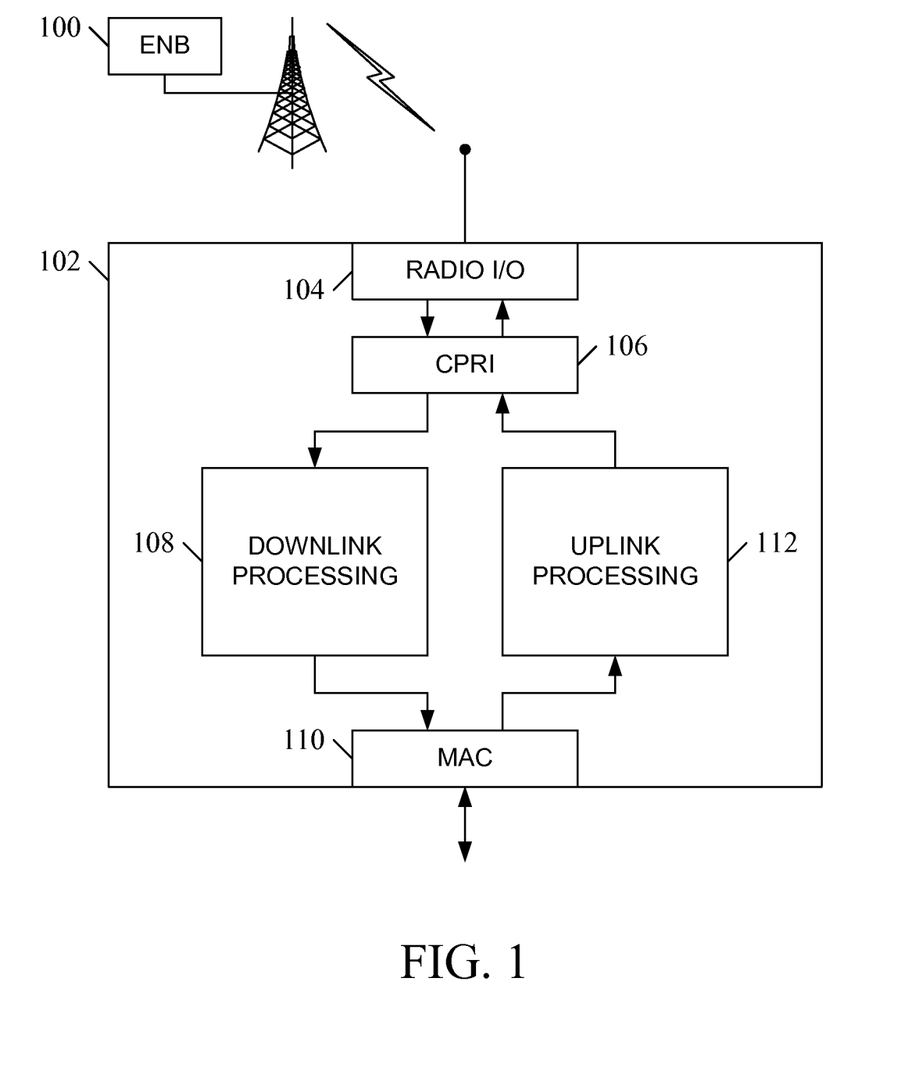
FIG. 1 is a block diagram illustrating a conventional LTE system in which an enhanced Node B is communicating with an LTE user equipment.

FIG. 1 shows a conventional LTE system in which an enhanced Node B (ENB) 100 communicates with an LTE user equipment (UE) 102. UE 102 communicates with ENB 100 via a radio frequency input/output interface 104. The signals from interface 104 are decoded and processed by a common public radio interface (CPRI) processor 106, which processes both downlink data, i.e., data from ENB 100 to the UE and uplink data, i.e., data from the UE to ENB 100. Downlink data undergoes downlink processing 108 on its way to a media access control (MAC) layer 110. Uplink data provided by MAC 110 undergoes uplink processing 112 on its way to CPRI 106.

Uplink and downlink data includes separate channels defined in the physical layer of the protocol stack, herein referred to as "physical channels." During both downlink processing 108 and uplink processing 112, the data transmitted via the physical channels may be processed by separate physical circuits, or they may be processed by the same circuit but as distinct logical channels or entities.

Two of the physical channels processed during downlink processing 108 are the physical downlink shared channel (PDSCH) and a physical downlink control channel (PDCCH), which conveys downlink control information (DCI) to UE 102. ENB 100 uses PDCCH to indicate to each UE what scheduled radio resources for uplink and downlink are available to that UE. DCI data is used to specify the resources (e.g., frequencies, time slots, etc.) that ENB 100 is allowing the UE to use for uplink and downlink, which is referred to as "grant" information. Depending on how much data the UE wants to send or receive, how many other UEs are trying to access the same eNode B, and other factors, the terms of the grant can and usually do change at every transmit time interval, or TTI. Other physical channels and signals include the physical control format indicator channel (PCFICH), the physical broadcast channel (PBCH), the primary synchronization signal (PSS), the secondary synchronization signal (SSS), and at least one reference signal (RS).

Two of the physical channels processed during uplink processing 112 are the physical uplink shared channel (PUSCH) and a physical uplink control channel (PUCCH), which conveys uplink control information (UCI) to ENB 100. UCI data includes scheduling requests and acknowledgement responses or retransmission requests (ACK and NACK.) However, PDCCH with a DCI format used to grant PUSCH transmissions as given by DCI format 0 is referred to as "uplink DCI" format when common behavior is addressed. Other physical channels and signals include the sounding reference signal (SRS) and the demodulation reference signal (DMRS). All of the physical channels are mapped on an orthogonal frequency-division multiplexing (OFDM) resource grid made up of resource elements (frequency) and ODFM symbols and slots (time).

Figure 2A:
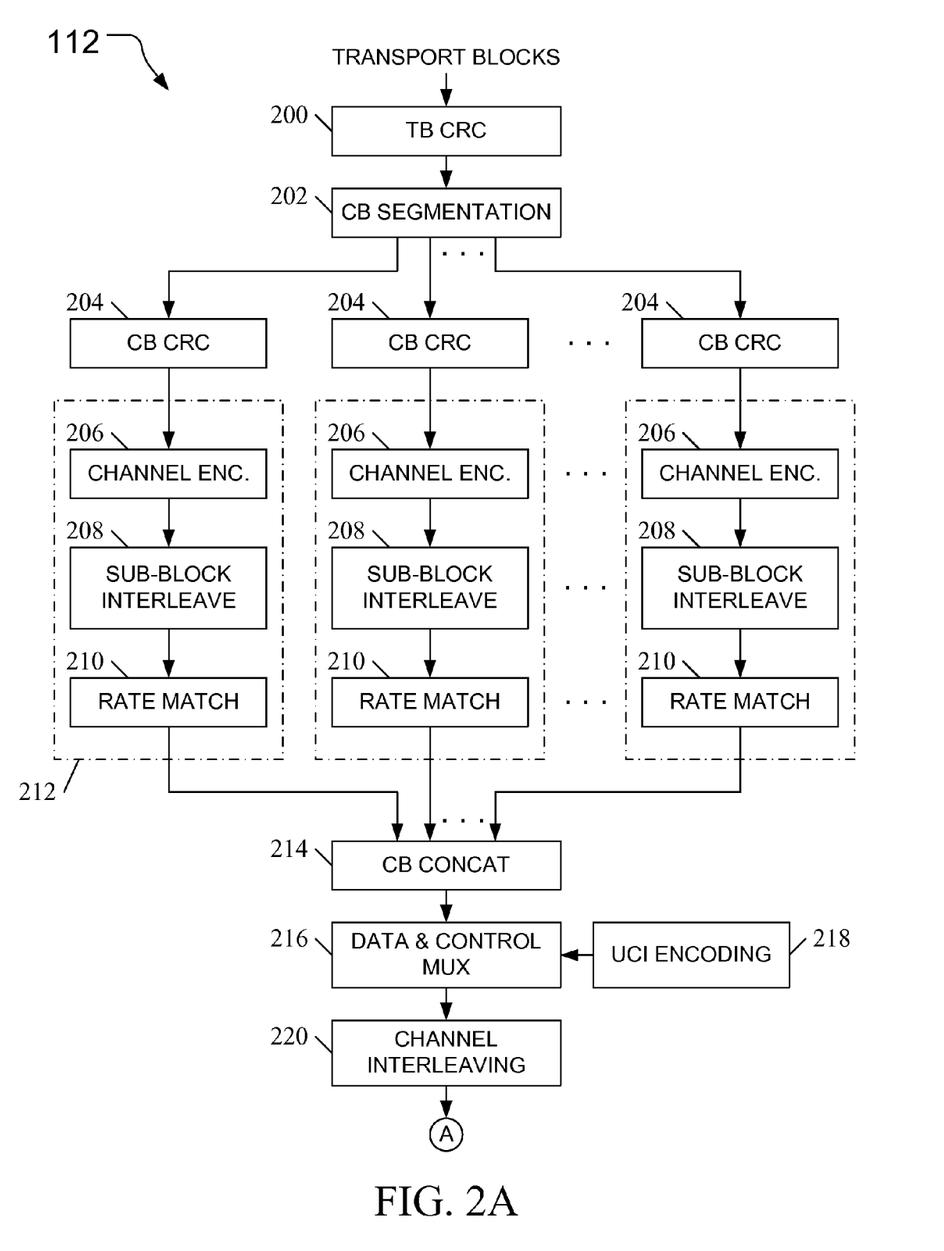
FIGS. 2A and 2B illustrate two portions of conventional LTE uplink processing, referred to as "part 1" and "part 2", respectively.
Figure 2B:
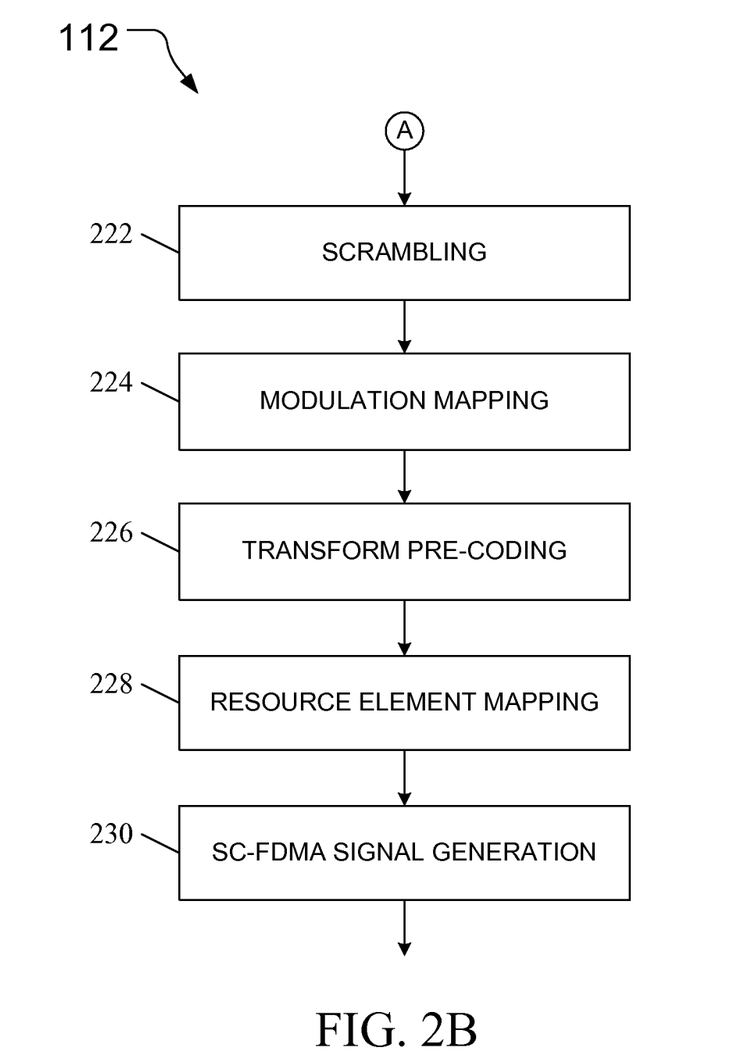

FIGS. 2A and 2B illustrate two portions of conventional LTE uplink processing 112, referred to as "part 1" and "part 2", respectively. Referring to FIG. 2A, uplink data is provided by MAC 110 in groups of data called transport blocks. The size of the transport block (TB) provided by MAC 110 is defined or determined by the grant information received from ENB 100. At step 200, a transport block cyclic redundancy check (TB CRC) is calculated and attached to the transport block. At step 202, the transport block and CRC is segmented into multiple code blocks and distributed for parallel processing. At step 204, a CRC value is calculated for and attached to the code blocks, which are then channel encoded (step 206), subjected to a sub-block interleave (step 208), and then rate matched (step 210). The steps of channel encoding, sub-block interleaving, and rate matching are of interest and are therefore logically grouped into a collection of steps 212. At step 214, the outputs of rate matchers 210 are concatenated and sent to step 216, where the data is multiplexed with uplink control information (UCI) that had been encoded in step 218. The multiplexed data then goes to a channel interleaving step 220. FIG. 2B shows a second portion of the process, which includes a scrambling step 222, a modulation mapping step 224, a transform pre-coding step 226, a resource element mapping step 228, and a SC-FDMA signal generation step 230.

Figure 3:
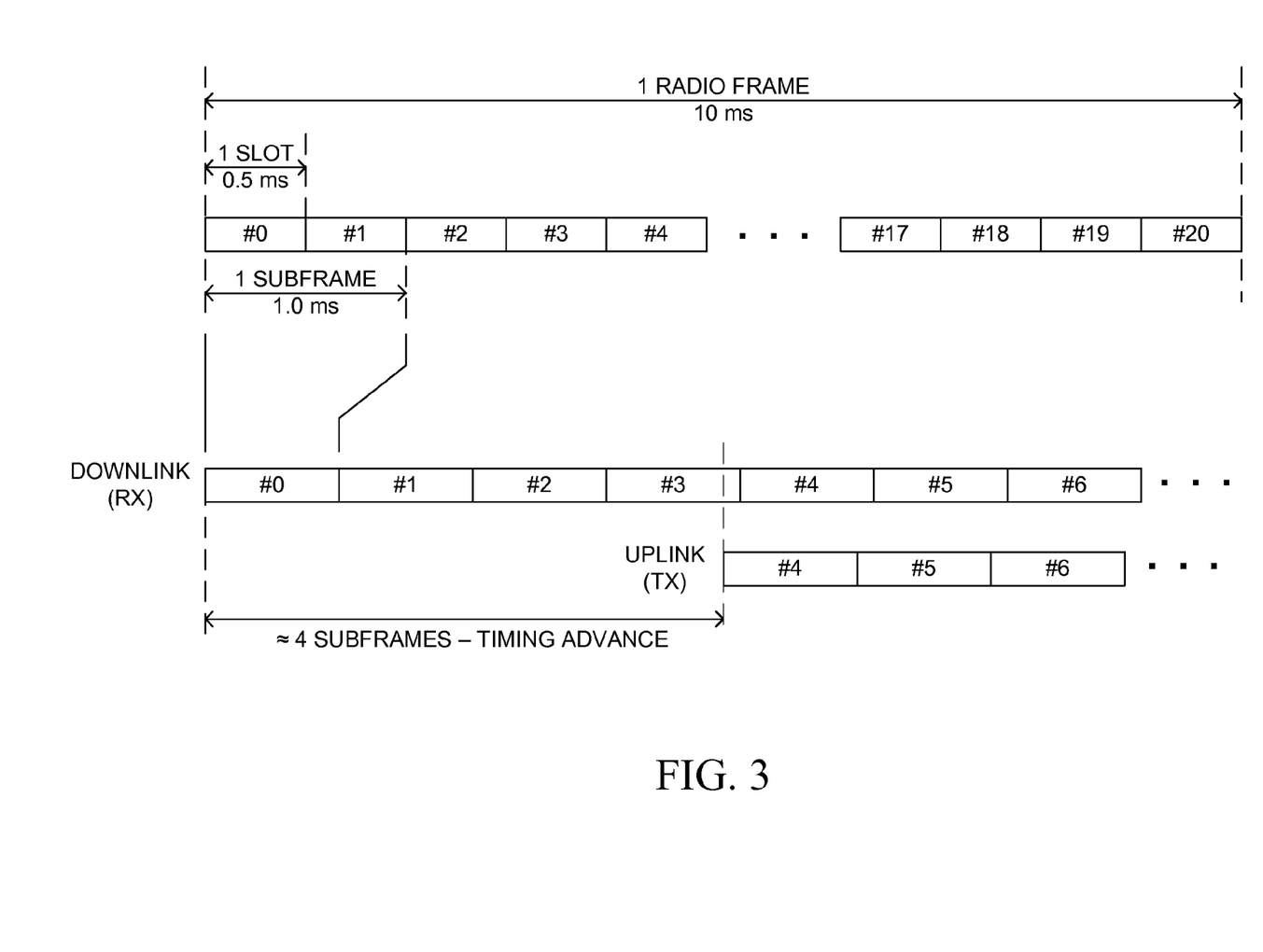
FIG. 3 illustrates the format of a conventional LTE radio frame and the timing difference between downlink and uplink data transmission.

FIG. 3 illustrates the format of one LTE radio frame. Each downlink or uplink LTE radio frame may be 10 milliseconds (ms) long comprising 10 sub-frames of 1 ms each. Each sub-frame may include 2 slots and/or 14 OFDM symbols. A slot may be 0.5 ms long and may include various amounts of LTE data. LTE data may be stored as modulated symbols in sub-carriers within an OFDM symbol. Each modulated symbol in a sub-carrier may typically represent two, four, or six bits. Sub-carriers may be data streams that are spaced 15 kilohertz apart from each other. A sub-carrier may typically carry data at a maximum rate of 15 kilo-symbols per second (ksps). In some embodiments, a LTE downlink sub-frame may typically include multiple resource blocks (RBs) of 12 sub-carriers, each sub-carrier with 14 OFDM symbols. The LTE downlink sub-frame may be partitioned into two equal downlink slots. Each downlink slot may include multiple blocks of 12 sub-carriers with 6 or 7 symbols per sub-carrier (e.g., depending on whether frame uses an extended cyclic prefix or a normal cyclic prefix).

FIG. 3 depicts the timing difference between downlink and uplink data. In some embodiments, Downlink DCI on sub-frame N is for PDSCH data in the same sub-frame. Uplink DCI on sub-frame N has scheduling or grant information for PUSCH in sub-frame N+4. Scheduling information may include grant information indicating certain RF components allocated for transmission or retransmissions for data associated with various UEs. This means that a user device may have about four sub-frames (~4 ms) from the start of the downlink signal to the start of transmission of the uplink signal. Within this time period, user device needs to perform downlink processing, decode the DCI, send the grant information to a higher layer, where a packet data unit (PDU) is segmented from the radio link control (RLC), get the packet data unit (PDU), also referred to herein as a TB, and do all physical layer uplink processing and perform SC-FDMA modulation for RF transmission on the uplink.

Moreover, an eNode B may demand that the UE advance the timing of its transmitted uplink data, e.g., to accommodate for distance from the UE to the tower. For example, as depicted in FIG. 3, a timing advance may reduce the processing time somewhat, so that the user device has less than 4 milliseconds to perform its processes. For reasons that will be explained below, this timing constraint poses technical challenges not only to designers of user devices but also to designers of test equipment that simulates traffic from multiple user devices. Further, finite hardware and logic resources available for data communications may pose technical challenges for such test equipment when simulating multiple user devices.

Assuming for simplicity a zero time advance, the time available from the start of downlink sub-frame with uplink grant to the start of PUSCH transmission is 4 ms, using the antenna port as the reference point for timing. Table 1, below, shows the steps involved in processing the downlink DCI and the timing budget for each step in the process in one example of a conventional implementation.

TABLE 1

Downlink DCI Processing

| Signal path/processing step | Time |
|---|---|
| Time budget | 4.0 ms |
| RF Reception + Downlink processing | −1.5 ms |
| MAC readies TB for uplink | −1.0 ms |
| Uplink control channel processing and uplink TB processing | −0.5 ms |
| Time remaining for uplink processing: | 1.0 ms |
| Uplink part2 + RF Transmission | −0.3 ms |
| Time remaining for uplink part1: | 0.7 ms |

As shown in Table 1, above, the time available for uplink processing (part1 and part2 together) and RF transmission is 1 millisecond.

Uplink part2 processing may include scrambling, mapping data bits to modulation symbols, performing a Discrete Fourier transform (DFT) encoding for SC-FD MA, mapping data to an uplink resource grid, and SC-FDMA signal generation and modulation on to an RF carrier. In some embodiments, since part2 processing may be performed on a block of channel bits for all user devices, the computational complexity and processing time is fixed for various combinations of user devices and different resource allocations for each user device's in a sub-frame. For example, the computational complexity and time for first few steps of part2 processing, such as scrambling and DFT mapping, may be linearly or proportionally based on the aggregate block size for all user devices. Later steps of part2 processing, such as SC-FDMA signal generation, may be performed within a fixed amount of time. Hence, because part2 processing includes steps that are linear in time and/or performed in a fixed amount of time, various cases, including worst case scenarios, may be performed within a particular time constraint imposed by the system or LTE standard (e.g., about a few symbols time or around 0.3 ms). This leaves only 0.7 milliseconds or 700 microseconds for uplink part1 processing.

Figure 4:
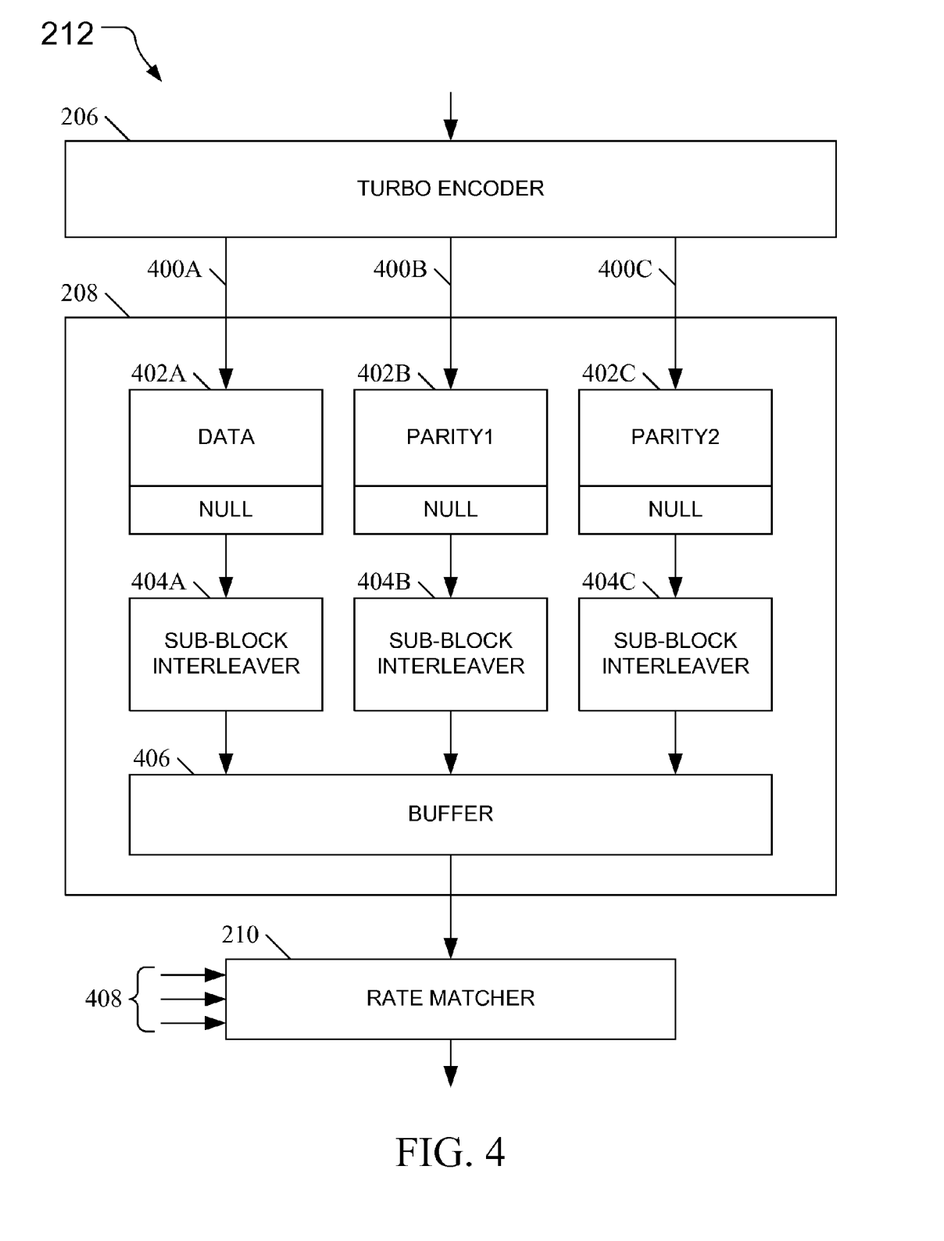
FIG. 4 illustrates in more detail a portion of the uplink process according to a conventional implementation.

FIG. 4 illustrates in more detail a portion of the uplink part1 process, shown as the collection of steps 212 in FIG. 2A, according to a conventional implementation. These steps are defined in section 5 of 3rd Generation Partnership Project (3GPP) Technical Specification 36.212, hereinafter referred to as "TS 36.212", which defines a standard for channel encoding 206, interleaving 208, and rate matching 210 of data and control streams from/to a MAC layer that are encoded/decoded to offer transport and control services over the radio transmission link.

According to section 5.1.3 of TS 36.212, channel encoding 206 may be performed according to the Turbo encoding algorithm, which produces three output bits for every input bit. As defined in section 5.1.4.1 of TS 36.212, each of the three bit streams 400A, 400B, and 400C (herein collectively referred to as bit-streams 400) may or may not include leading NULL bits as padding. In the embodiment illustrated in FIG. 4, the bit streams are NULL padded. Each bit stream 400A, 400B, and 400C is stored into its respective data buffer 402A, 402B, and 402C. These data buffers are herein collectively referred to as pre-interleave buffers 402. Once these buffers are full, each bit stream can be processed by its respective sub-block interleaver 404A, 404B, or 404C, which are herein collectively referred to as interleavers 404. Each sub-block interleaver 404A, 404B, and 404C saves the interleaved bit stream into another data buffer 406A, 406B, or 406C, respectively. These second data buffers are herein collectively referred to as post-interleave buffers 406. The outputs from the sub-block interleavers are sent to rate matcher 210, which collects the interleaved bits and then selects or prunes the collected bits so as to produce a bit stream that is rate matched to the available radio resources to transmit the signal after subsequent steps in the uplink processing chain. Rate matcher 210 collects and selects or prunes bits according to information provided to rate matcher 210 via control signals 408, such as the redundancy value index and other information needed by rate matcher 210.

Each of the sub-block interleavers 404 operates according to the algorithm defined in Section 5.1.4.1.1 of TS 36.212, which involves, for each bit stream, padding the bit stream with leading nulls in order to fully fill a matrix having 32 columns and a variable number of rows, depending on the code block size. The maximum size matrix is 32 columns by 192 row matrix (6144 bits total). First, the matrix is filled row by row. Next, the columns of the matrix are rearranged according to a predefined map. The matrix is then drained column by column. A simplified example of this operation is shown in FIG. 5.

Figure 5:
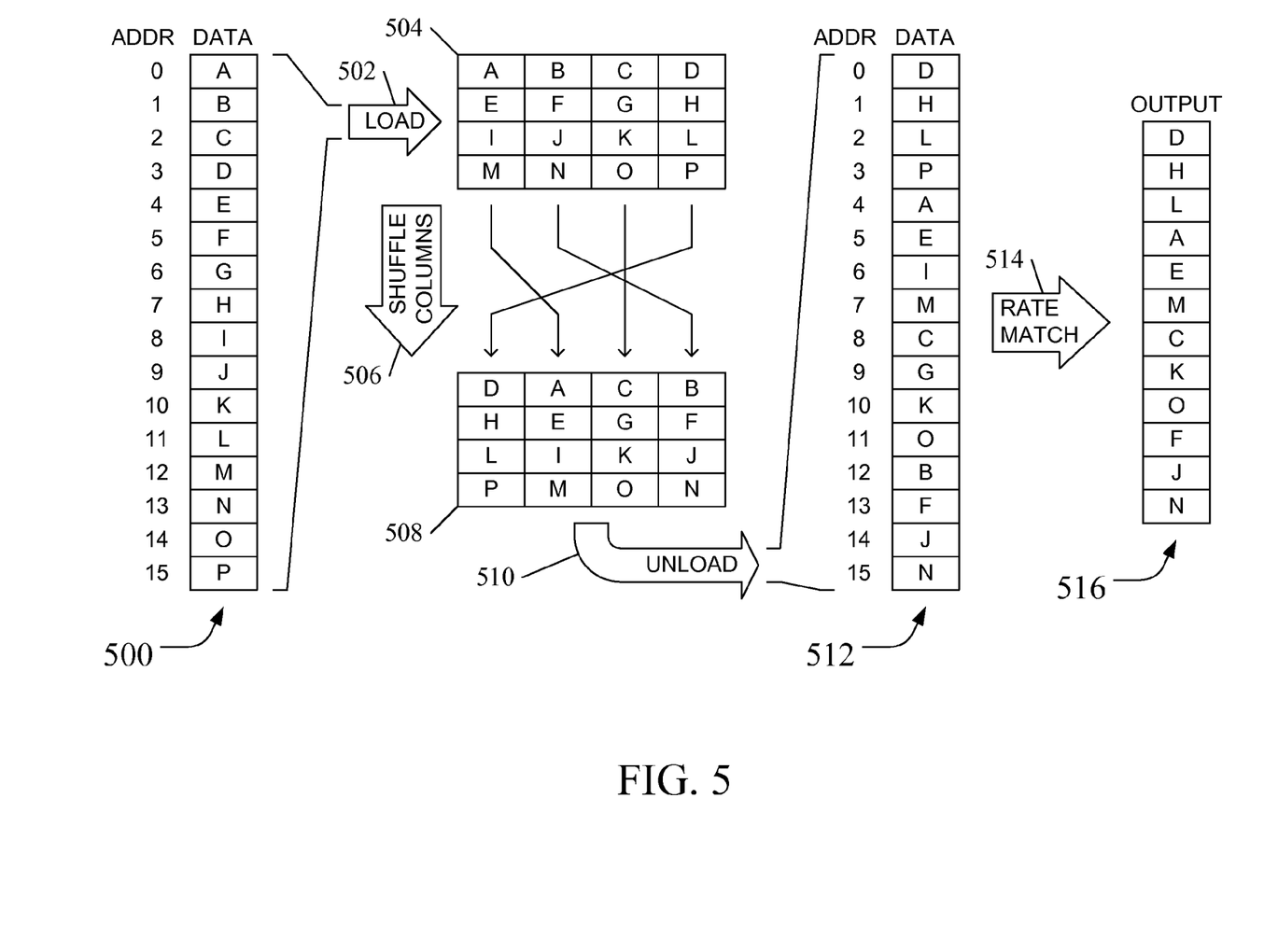
FIG. 5 illustrates a simplified example of an interleaving function.

FIG. 5 illustrates an example of a conventional interleaving function, which for simplicity interleaves a block of 16 bits instead of the maximum block of 6144 bits as defined in TS 36.212. The non-interleaved bit stream data is shown occupying 16 contiguous addresses in a buffer memory 500. The bits of the bit stream are represented by variables A through P, and the relative address of each bit is shown to the left of the data. In the example illustrated in FIG. 5 bit A is located in relative address 0, bit B is located in relative address 1, and so on. Bits A through P are loaded 502 into a 4×4 matrix, i.e., the matrix is loaded row by row, from left to right and from top to bottom, resulting in the arrangement of data within the matrix shown as 504. The columns of the matrix are shuffled 506, resulting in the arrangement of data within the matrix shown as 508. The data is then unloaded 510, i.e., read out of the matrix column by column, top to bottom and left to right, and stored into another buffer memory 512. The relative order of the interleaved data is shown in 512: bit D now occupies relative address 0, bit H now occupies relative address 1, and so on. The interleaved data is then rate matched 514, which in this example reduces the number of bits from 16 to 12. The bits selected for output are shown as output 516.

There are disadvantages to the example implementation shown in FIG. 4. TS 36.212 requires that the whole block of data from turbo encoder 206 be ready and waiting in pre-interleave buffers 402 before starting sub-block interleaving. Sub-block interleavers 404 then select the bit sequence as defined by the interleaver function and write to post-interleave buffer 406. For a 6,144 bit code block, the maximum code block size, each of the sub-block interleavers 404 takes 6,144 clock cycles to complete writing the output to post-interleave buffers 408. Since rate matcher 210 can start only after completion of sub-block interleaving, every interleaving process introduces a N clock cycle delay in the uplink data path, where N is the size of the code block. Since there can be multiple code blocks from the transport block segmentation, the same time delay is introduced again for every additional code block.

Uplink part1 processing may be based on uplink control information, including scheduling information that can affect TB size, channel allocation, resource block allocation, type of modulation, and UCI data, among other things. Numerous combinations of these parameters may occur based on scheduling information, which may differ among sub-frames. As such, part1 processing time may vary significantly between sub-frames and transport blocks. For example, an uplink processing device running at 125 MHz clock speed would take about 49 μs to do interleaving process for a 6144 bit code block. For 13 such blocks in a TTI (1 ms) which is a worst case with 1 UE at the maximum data rate, it would take about 639 μs which is a significant amount of time for each TTI. While this timing constraint may be acceptable for a single UE, it poses a significant obstacle to the development of multi-UE emulators or simulators, intelligent traffic generators, eNode B simulators or simulators, and network test equipment. Furthermore, when simulating multiple user devices, another level of complexity may arise as each user device may be associated with independent scheduling information. For multiple UE simulators/emulators, such as traffic emulation systems or test equipment, for example, uplink part1 processing must be duplicated for each UE being emulated.

Another disadvantage of the example implementation shown in FIG. 4 is that it requires both pre-interleave buffers 402 (corresponding to buffer 500 in FIG. 5) and post-interleave buffers 406 (corresponding to buffer 512 in FIG. 5.) Rate matcher 210 then reads data from post-interleave buffers 406, which takes N clock cycles where N is the number of channel bits. These serial operations are time consuming and require multiple memories on a single UE. These disadvantages are multiplied for multiple UE emulation systems.

For these reasons it is difficult to meet the timing requirements for all configurations when using a conventional implementation such as the one shown in FIG. 4. Table 2, below shows the time required for steps of uplink part1 processing in a multi-UE emulation system using the example conventional implementation shown in FIG. 4 for one specific case:

TABLE 2

| Uplink part1, conventional implementation | |
|---|---|
| Signal path/processing step | Time |
| Turbo encoder processing | 500.00 μs |
| Memory processing | 0.01 μs |
| Sub-block interleaving | 300.00 μs |
| Sub-block memory processing | 0.01 μs |
| Rate matching | 100.00 μs |
| Time required for Uplink part1 processing: | 900.02 μs |

As shown in Table 2, above, in some specific cases—depending on the sizes of the transport blocks, the number of UEs being emulated, and so on—the time required to perform uplink part1 processing using the conventional implementation may exceed the timing budget. In the specific case shown in Table 2, for example, uplink part1 processing took 900.02 microseconds, longer than the available 700 microseconds.

Accordingly, in light of these disadvantages associated with conventional architectures, there exists a need for methods, systems, and computer readable media for fast, reduced memory and integrated sub-block interleaving and rate matching.

SUMMARY

According to one aspect, the subject matter described herein includes a system for integrated sub-block interleaving and rate matching. The system includes a buffer memory for storing sub-block data that has been encoded according to a channel encoding algorithm and a rate matching module for reading the sub-block data from the buffer memory using a sequence of addresses according to an interleaving algorithm, such that data is transferred from the buffer memory to the rate matching module in an order that emulates the order that the data would be produced by the interleaving algorithm or in the order that the data would be produced by the interleaving algorithm as modified by a rate matching algorithm. In one embodiment, data is transferred from the buffer memory to the rate matching module using a sequence of addresses according to an interleaving algorithm and modified according to a rate matching algorithm, such that the data is transferred from the buffer memory to the rate matching module in an order that emulates the order that the data would be produced by the interleaving algorithm as modified by the rate matching algorithm.

According to another aspect, the subject matter described herein includes a method for integrated sub-block interleaving and rate matching. The method includes storing sub-block data that has been encoded according to a channel encoding algorithm into a buffer memory and transferring data from the buffer memory to a rate matching module using a sequence of addresses according to an interleaving algorithm, such that data is transferred from the buffer memory to the rate matching module in an order that emulates the order that the data would be produced by the interleaving algorithm. In one embodiment, data is transferred from the buffer memory to the rate matching module using a sequence of addresses according to an interleaving algorithm and modified according to a rate matching algorithm, such that the data is transferred from the buffer memory to the rate matching module in an order that emulates the order that the data would be produced by the interleaving algorithm as modified by the rate matching algorithm.

The subject matter described herein can be implemented in software in combination with hardware and/or firmware. For example, the subject matter described herein can be implemented in software executed by a processor. Examples of hardware include analog or digital circuits, application specific integrated circuits, field programmable gate arrays, logic for implementing a function, other types of circuits, or combinations of the above. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for fast, reduced memory and integrated sub-block interleaving and rate matching. Reference will now be made in detail to exemplary embodiments of the present invention, examples of which are illustrated in the accompanying drawings. Wherever possible, the same reference numbers will be used throughout the drawings to refer to the same or like parts.

Figure 6:
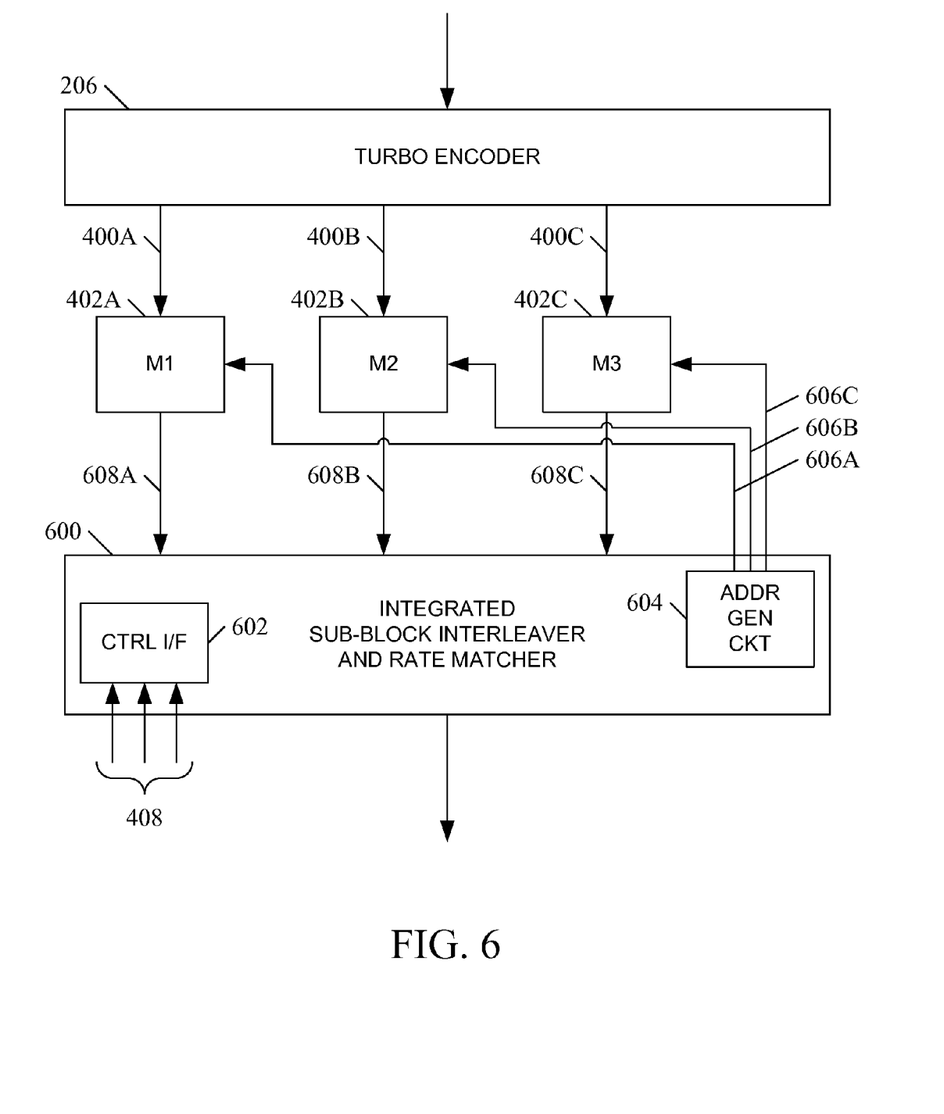
FIG. 6 is a block diagram illustrating an exemplary system for fast, reduced memory and integrated sub-block interleaving and rate matching according to an embodiment of the subject matter described herein.

FIG. 6 is a block diagram illustrating an exemplary system for fast, reduced memory and integrated sub-block interleaving and rate matching according to an embodiment of the subject matter described herein. In FIG. 6, encoder 206 has identical function as the like-numbered counterpart in FIG. 2A, and elements 400A-C and 402A-C have identical function as their like-numbered counterparts in FIG. 4; therefore, their descriptions will not be repeated. In contrast to the system illustrated in FIG. 4, however, in the embodiment illustrated in FIG. 6, sub-block interleavers 404 and post-interleave buffers 406 are rendered unnecessary by an integrated sub-block interleaver and rate matcher, herein referred to as module 600, that performs real-time address computation for fast sub-block interleaving.

Module 600 includes a control interface 602 that receives control information, which includes at least some of the same information 408 that is used by conventional rate matcher 210 in FIG. 4, and an address sequencer 604 that performs fast interleaving by producing a series of addresses in a sequence such that the data being read from pre-interleave buffers 402 is in the order that the data would have been read out of post-interleave buffers 406 of the conventional system illustrated in FIG. 4. This obviates the need for sub-block interleavers 404 as well as post-interleave buffers 406 that are used in the example illustrated in FIG. 4. Not only does address sequencer 604 eliminate the hardware associated with sub-block interleavers 404 and post-interleave buffers 406, address sequencer 604 eliminates the time required by the example illustrated in FIG. 4 to fill each sub-block interleaver 404, perform the interleaving function, write the interleaved data into a post-interleave buffer 406, and read the interleaved data from post-interleave buffers 406 into rate matcher 210. This is a significant time savings.

In the embodiment illustrated in FIG. 6, pre-interleave buffers 302 may be a portion of a memory which allows random access of its contents by address, such as SRAM or DRAM. Address sequencer 604 reads data from each of buffers 302A, 302B, and 302C in an order according to an interleaving algorithm and considering at least some of the control information 408 and performs rate matching on that data. In one embodiment, address sequencer 604 may present data to be rate matched in the order defined in Section 5.1.4.1.1 of TS 36.212.

In the embodiment illustrated in FIG. 6, address sequencer 604 outputs three individual address on separate address buses 606A, 606B, and 606C, which are addresses into buffers 302A, 302B, and 302C, respectively. The data is transferred from buffers 302A, 302B, and 302C to module 600 via individual data buses 608A, 608B, and 608C, respectively. In alternative embodiments, buffers 302 may share an address bus and/or share a data bus, in which case address sequencer 604 may also output a chip select or enable signal to each of the pre-interleave buffers 302. In another embodiment, more than one address sequencer 604 may operate in parallel. For example, multiple address sequencers may operate in parallel, each address sequencer calculating a sequence of addresses for one or more buffers 302 under its control. Thus, in one embodiment, address sequencer 604 performs sub-block interleaving and rate matching simultaneously.

Integrated sub-block interleaver and rate matcher 600 may be used in an LTE UE, such as a mobile phone or smart device. Such a device would benefit from the reduced resource requirements afforded by the elimination of buffer memories and interleaving hardware, for example, as well as the associated reduction in processing time, which may translate directly to power savings, performance increases, or both.

Integrated sub-block interleaver and rate matcher 600 may be used in an LTE traffic generator, traffic emulator, or other type of test equipment. For example, an LTE traffic generator may use the concepts and subject matter described herein to emulate the traffic that would be generated by one or more UEs as they communicate with an LTE enhanced node B or other entity with an LTE network. Such an LTE traffic generator would be useful to stress-test an enhanced node B design, for example, to verify LTE network robustness in the face of high traffic loads, to check an LTE network (or particular entities within an LTE network) for susceptibility to particular fault conditions, and the like. Such a device would also benefit from the resource, time, and power savings inherent in the subject matter disclosed herein, which may allow a piece of test equipment to emulate a greater number of UEs at a time.

Integrated sub-block interleaver and rate matcher 600 disclosed herein is not limited to LTE application, but may be applied to other systems as well. For example, the address sequencer described herein may implement interleaving algorithms other than those defined by the LTE specification.

Figure 7A:
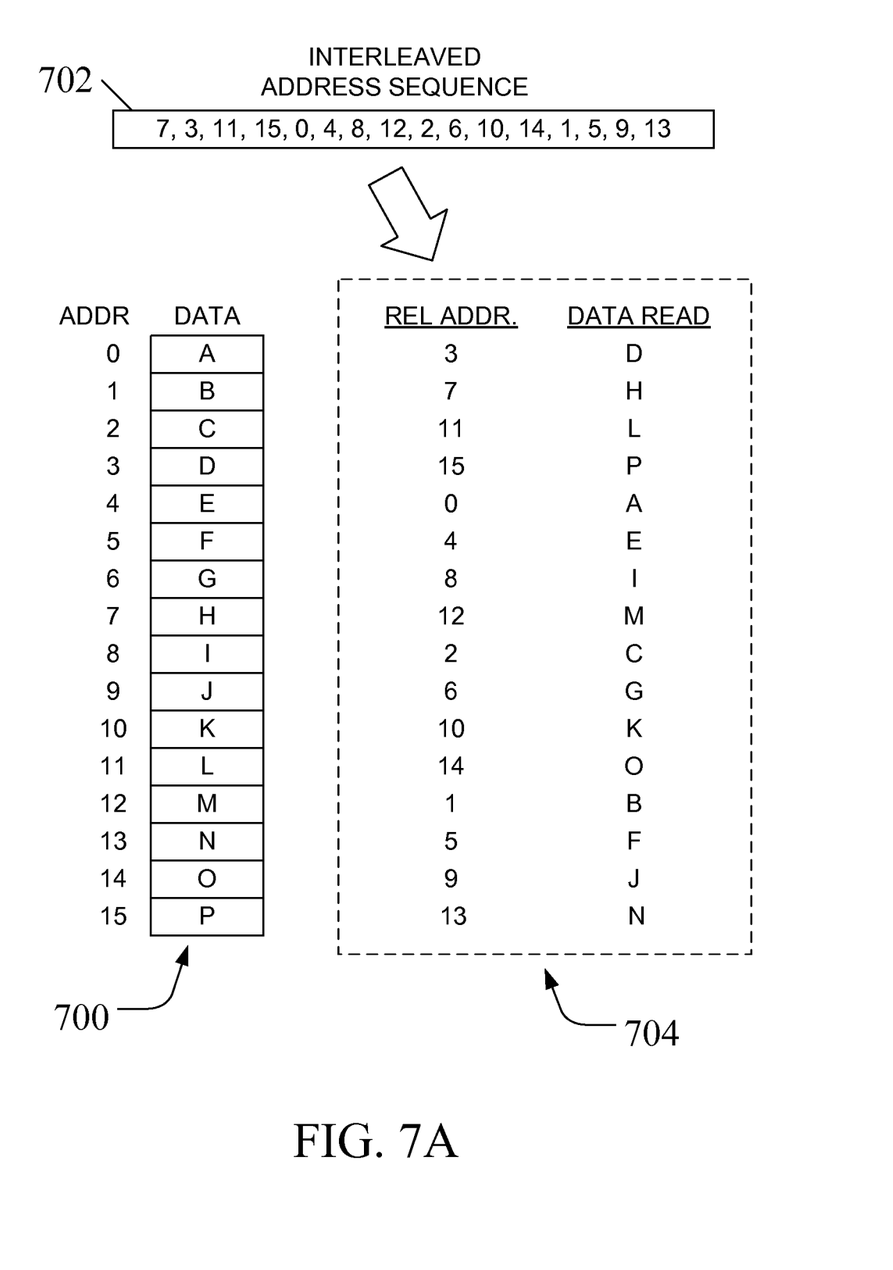
FIG. 7A is a simplified example to illustrate an exemplary implementation of a sub-block interleaver and rate matcher according to an embodiment of the subject matter described herein.
Figure 7B:
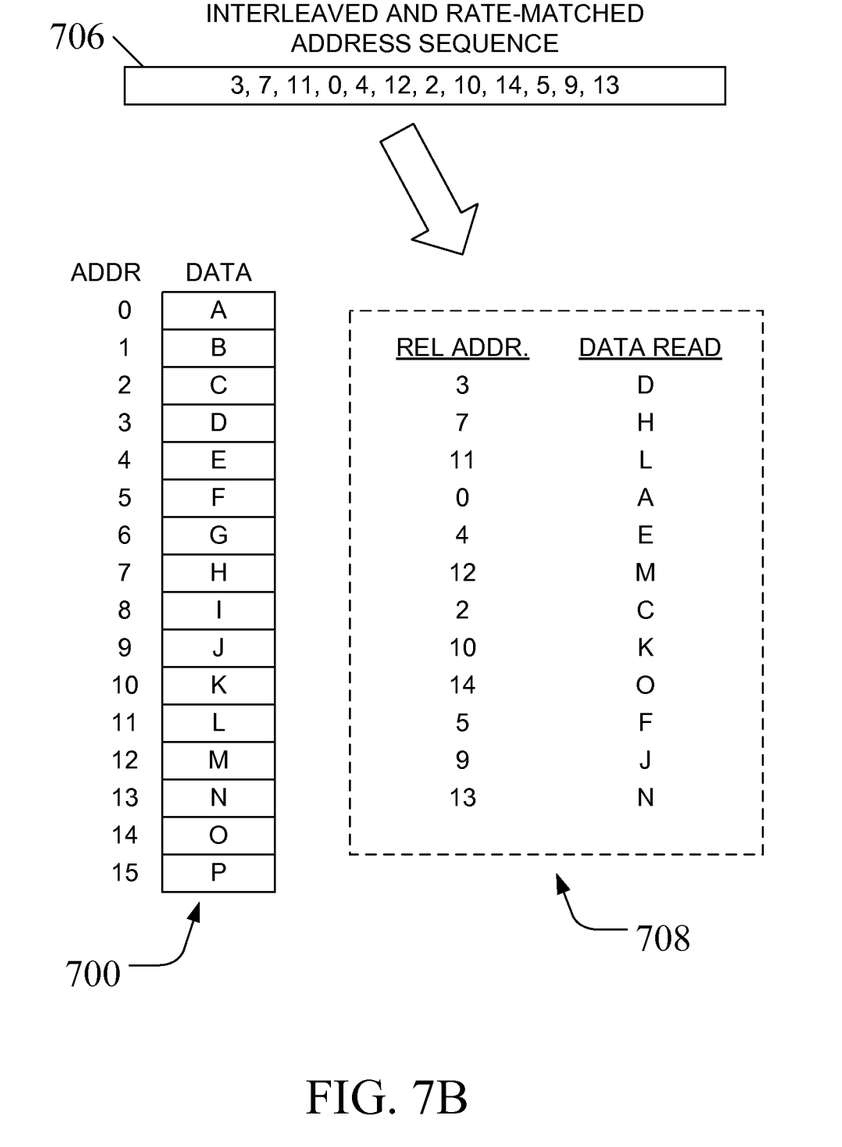
FIG. 7B is a simplified example to illustrate an exemplary implementation of a sub-block interleaver and rate matcher according to another embodiment of the subject matter described herein.

FIGS. 7A and 7B are simplified examples to illustrate an exemplary implementation of integrated sub-block interleaving and rate matching according to embodiments of the subject matter described herein. In contrast to the example shown in FIG. 5, in which non-interleaved data 500 is loaded row-by-row into a matrix, the filled matrix is column shuffled, and the data is then unloaded column-by-column to produce interleaved data 512, which is then rate matched to produce output 516, integrated sub-block interleaver and rate matcher 600 accomplishes the same result with fewer steps and fewer resources.

In FIG. 7A, non-interleaved data 700 is read directly according to an address sequence 702 that is generated by address sequencer 604. In the embodiment illustrated in FIG. 6, for example, non-interleaved data 700 may be stored in pre-interleave buffer 302; address sequencer 604 provides the address sequence 702 via address buses 606 to the respective pre-interleave buffers 302, and the data are transferred from buffers 302 to module 600 via data buses 608 in the address sequence provided by address sequencer 604. Table 704 includes the address sequence and data corresponding to each address in that sequence. In the simplified example illustrated in FIG. 7A, address sequence 702 is "3, 7, 11, 15, 0, 4, 8, 12, 2, 6, 10, 14, 1,5, 9, 13" and the data that is provided to module 600 will therefore be "D, H, L, P, A, E, I, M, C, G, K, O, B, F, J, N". This is the same sequence that is produced by sub-block interleavers 404 in the conventional system illustrated in FIG. 4 and that shows up as data sequence 512 in the simplified example illustrated in 5. In this embodiment, module 600 may then perform rate matching and produce a rate-matched output data stream.

In FIG. 7B, address sequence 706 takes into account not only the interleaving algorithms of conventional sub-block interleavers 404 but also the rate matching algorithms of conventional rate matcher 210. In one embodiment, address sequencer 604 considers at least some of the same control signals 408 that are used by conventional rate matcher 210. Table 708 includes the address sequence and data corresponding to each address in that sequence. In the simplified example illustrated in FIG. 7B, address sequence 706 is "3, 7, 11, 0, 4, 12, 2, 10, 14, 5, 9, 13" and the data that is provided to module 600 will therefore be "D, H, L, A, E, M, C, K, O, F, J, N". This is the same sequence that is produced by rate matcher 210 the conventional system illustrated in FIG. 4 and that shows up as output 516 in the simplified example illustrated in 5. In this embodiment, the rate matching has already been considered in the address sequence and so module 600 may simply output, as rate-matched data, the data in the order that it was read from the pre-interleave buffers.

In contrast to the example shown in FIGS. 4 and 5, however, the embodiment illustrated in FIG. 6 does not require a 4×4 matrix, such as matrix 504 or 508 in FIG. 5, and does not require the post-interleave buffer 512 in FIG. 5. Thus, the embodiment illustrated in FIG. 6 does not need to take the time to load a matrix from pre-interleave buffer 500, shuffle the matrix 506, unload the matrix 510 into post-interleave buffer 512, or read the interleaved data from post-interleave buffer 512 into a rate matcher 514. Instead, address sequencer 604 simply allows module 600 to read data directly from pre-interleave buffers 402 according to addresses specified by address sequencer 604 and informed by control signals 408 and perform rate-matching immediately.

Figure 8:
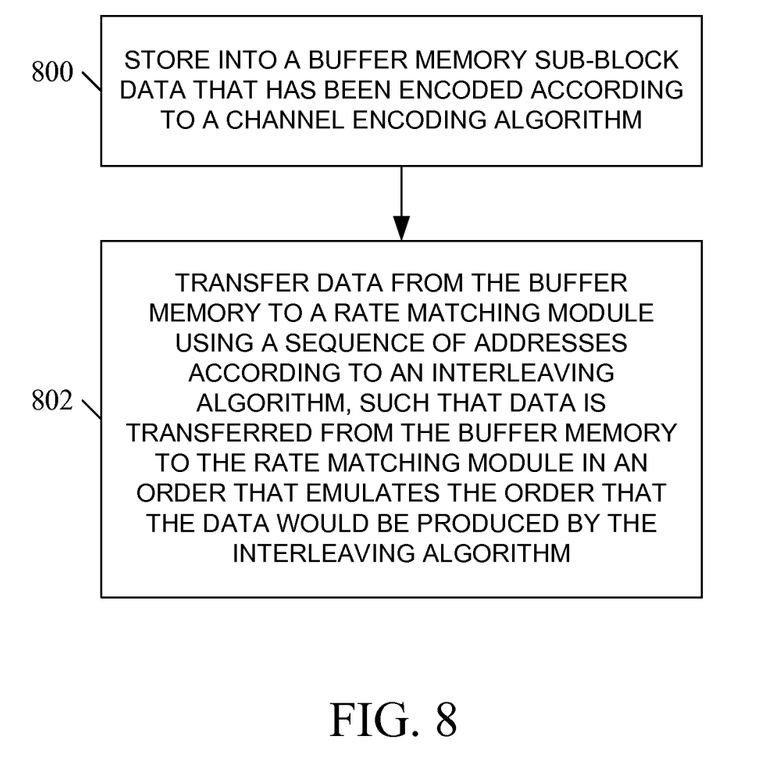
FIG. 8 is a flow chart illustrating an exemplary process for fast, reduced memory and integrated sub-block interleaving and rate matching according to an embodiment of the subject matter described herein.

FIG. 8 is a flow chart illustrating an exemplary process for fast, reduced memory and integrated sub-block interleaving and rate matching according to an embodiment of the subject matter described herein. The method includes, at block 800, storing sub-block data that has been encoded according to a channel encoding algorithm into a buffer memory, and, at block 802, transferring data from the buffer memory to a rate matching module using a sequence of addresses according to an interleaving algorithm, such that data is transferred from the buffer memory to the rate matching module in an order that emulates the order that the data would be produced by the interleaving algorithm.

The performance of the conventional implementation 212 versus integrated sub-block interleaver and rate matcher 600 will now be compared. As shown in Table 1, above, the time available for uplink part1 processing is 0.7 milliseconds or 700 microseconds. As shown in Table 2, above, a conventional implementation such as shown in FIG. 4 required 900.02 microseconds. In contrast, the integrated sub-block interleaver and rate matcher, such as the one shown in FIG. 6, processed the same specific case and achieved the same result but in significantly less time, as shown in Table 3, below:

TABLE 3

Uplink part1, w/integrated sub-block interleaver and rate matcher

| Signal path/processing step | Time |
| --- | --- |
| Turbo encoder processing | 500.00 μs |
| Memory processing | 0.01 μs |
| Real-time address computation of sub-block interleaving | 0.01 μs |
| Rate matching | 100.00 μs |
| Time required for Uplink part1 processing: | 600.02 μs |

As can be seen in Table 3, above, the integrated sub-block interleaving and rate matching module 600 reduced uplink part1 processing time for a specific case from 900 μs to 600 μs, which is within the timing budget of 700 μs.

In addition to a performance improvement over conventional implementations, the integrated sub-block interleaving and rate matching systems and methods described herein reduce the hardware footprint as well. In contrast to a conventional implementation, which requires memory both at the input and the output of the interleaver block, the integrated sub-block interleaver and rate matcher described herein replaces physical processing of sub-block interleaving with direct address computation and fetching of the data bits. Because the direct address of the data bit in the output buffer of the channel encoder is computed in real-time and fetched, the integrated sub-block interleaver and rate matcher saves not only the time that would otherwise be spent by the physical sub-block interleaver but also obviates the need for the additional buffer memory used by conventional systems for storing the output of the interleavers prior to processing by the rate matcher. This saves N clock cycles per code block, where N is the size of the code block. For a maximum size code block, the systems and methods described herein save 6,144 clock cycles per code block processed.

It will be apparent to one of skill in the art that the time and resource savings provided by the integrated sub-block interleaving and rate matching systems and methods described herein are beneficial in a range of applications, from a single UE, such as a mobile device, to large, multi-UE simulation or emulation devices, such as test equipment, traffic generators, traffic analyzers, to name a few.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for integrated sub-block interleaving and rate matching, the system comprising:
a buffer memory for storing sub-block data that has been encoded according to a channel encoding algorithm;
a rate matching module for reading the sub-block data from the buffer memory using a sequence of addresses according to an interleaving algorithm and modified according to a rate matching algorithm such that data is transferred from the buffer memory to the rate matching module in an order that emulates the order that the data would be produced by the interleaving algorithm as modified by the rate matching algorithm.

2. The system of claim 1 comprising a long term evolution traffic generator, wherein the buffer memory and the rate matching module are components of the long term evolution traffic generator.

3. The system of claim 2 wherein the long term evolution traffic generator emulates at least one long term evolution user equipment.

4. The system of claim 1 comprising a long term evolution user equipment, wherein the buffer memory and the rate matching module are components of the long term evolution user equipment.

5. The system of claim 1 wherein the sequence of addresses is produced by an address sequencer module.

6. The system of claim 1 wherein the address sequencer module is a component of the rate matching module.

7. The system of claim 1 wherein the address sequencer module is separate from the rate matching module.

8. The system of claim 1 wherein the buffer memory comprises a random access memory.

9. The system of claim 1 comprising a Turbo encoder for encoding the sub-block data that is stored in the buffer memory.

10. A method for integrated sub-block interleaving and rate matching, the method comprising:
storing sub-block data that has been encoded according to a channel encoding algorithm into a buffer memory; and
transferring data from the buffer memory to a rate matching module using a sequence of addresses according to an interleaving algorithm and modified according to a rate matching algorithm, such that data is transferred from the buffer memory to the rate matching module in an order that emulates the order that the data would be produced by the interleaving algorithm as modified by the rate matching algorithm.

11. The method of claim 10 wherein storing sub-block data that has been encoded according to a channel encoding algorithm into a buffer memory comprises storing data into a random access memory.

12. The method of claim 10 wherein storing sub-block data that has been encoded according to a channel encoding algorithm into a buffer memory comprises storing sub-block data that has been encoded with a Turbo encoder.

13. The method of claim 10 wherein the steps of claim 10 are performed by a long term evolution traffic generator.

14. The method of claim 13 wherein the long term evolution traffic generator emulates at least one long term evolution user equipment.

15. The method of claim 10 wherein the steps of claim 10 are performed by a long term evolution user equipment.

16. A method for integrated sub-block interleaving and rate matching, the method comprising:
storing sub-block data that has been encoded according to a channel encoding algorithm into a buffer memory; and
transferring data from the buffer memory to a rate matching module using a sequence of addresses according to an interleaving algorithm, such that data is transferred from the buffer memory to the rate matching module in an order that emulates the order that the data would be produced by the interleaving algorithm, wherein storing sub-block data that has been encoded according to a channel encoding algorithm into a buffer memory comprises storing sub-block data that has been encoded with a Turbo encoder, and wherein storing sub-block data that has been encoded according to a channel encoding algorithm comprises storing sub-block data that has been encoded according to a long term evolution standard.

17. A non-transitory computer readable medium having stored thereon executable instructions that when executed by the processor of a computer control the computer to perform steps comprising:
storing sub-block data that has been encoded according to a channel encoding algorithm into a buffer memory; and
transferring data from the buffer memory to a rate matching module using a sequence of addresses according to an interleaving algorithm and modified according to a rate matching algorithm, such that data is transferred from the buffer memory to the rate matching module in an order that emulates the order that the data would be produced by the interleaving algorithm as modified by the rate matching algorithm.

* * * * *